July 20, 1954  R. E. BLETCHER  2,684,082
SURFACE FITTING
Filed March 9, 1950  2 Sheets-Sheet 1
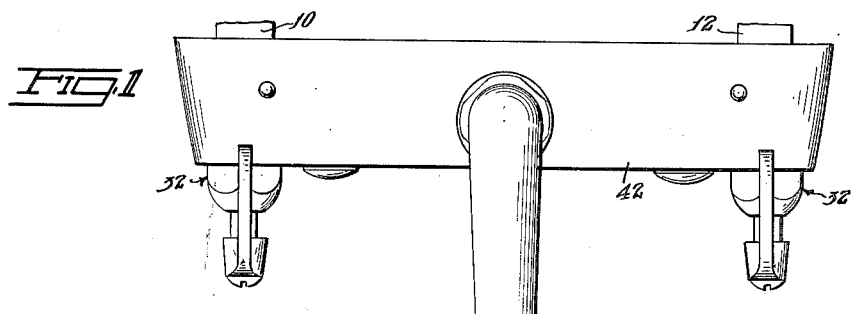
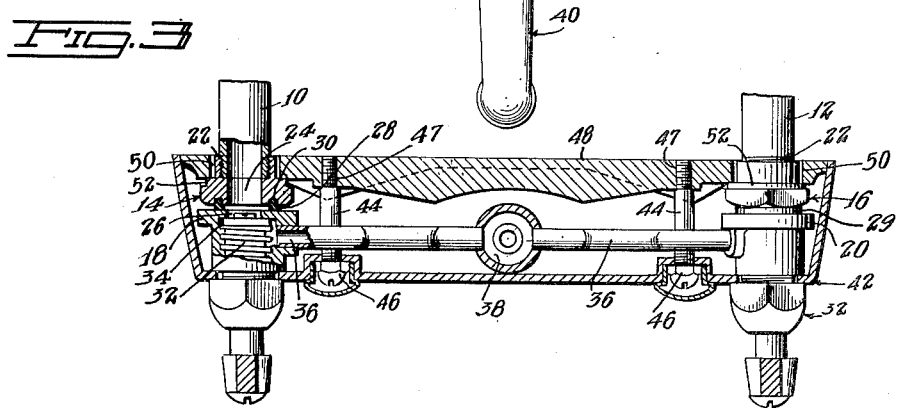
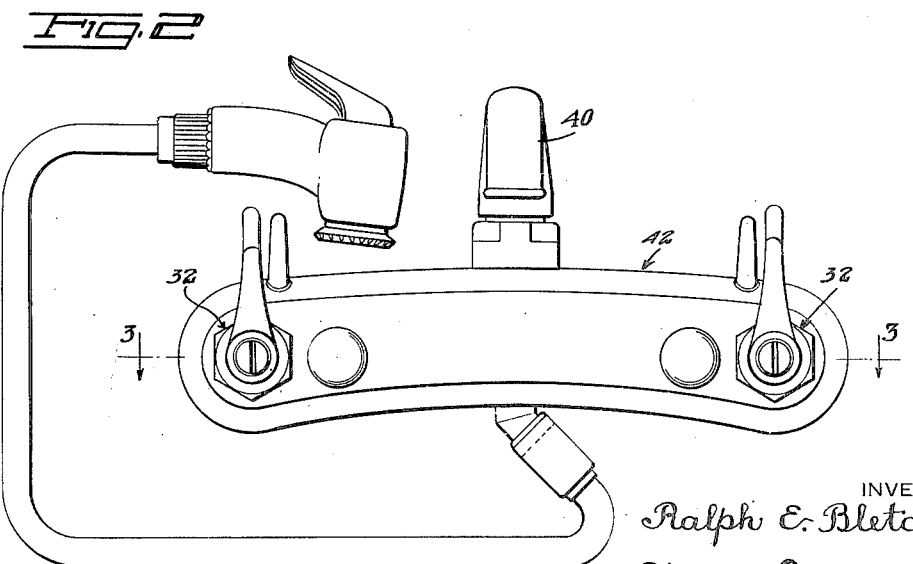
INVENTOR.
Ralph E. Bletcher
BY
Lyon & Lyon
ATTORNEYS.

July 20, 1954  R. E. BLETCHER  2,684,082
SURFACE FITTING
Filed March 9, 1950  2 Sheets-Sheet 2
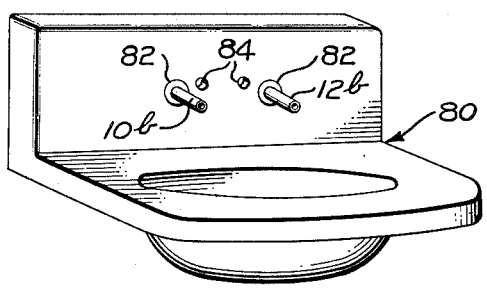
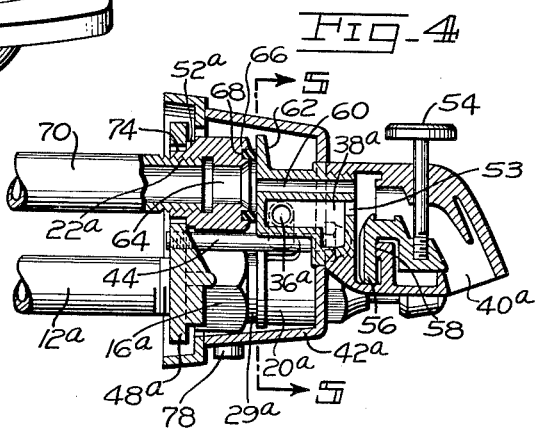
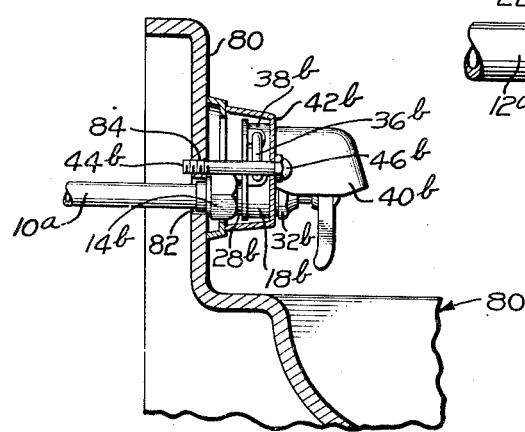
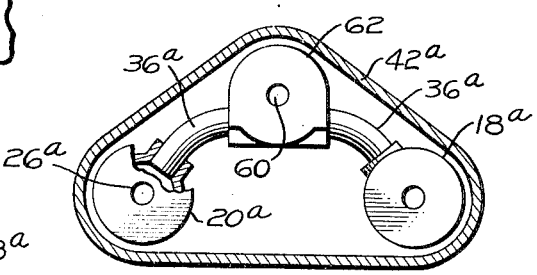
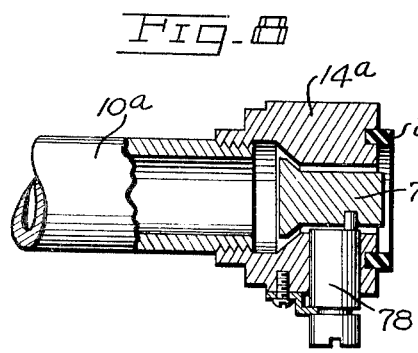
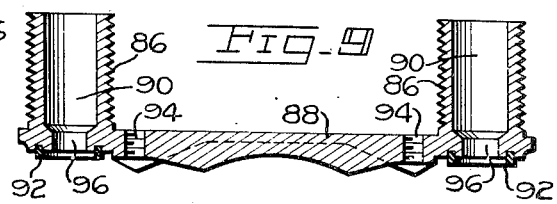
INVENTOR.
Ralph E. Bletcher
BY Lyon & Lyon
ATTORNEYS Patented July 20, 1954

2,684,082

UNITED STATES PATENT OFFICE 2,684,082

SURFACE FITTING

Ralph Edwin Bletcher, Los Angeles, Calif., assignor of ten per cent to Ralph E. Bletcher, twelve and one-half per cent to Ernest H. Bucknell, twelve and one-half per cent to Mabel Bucknell, ten per cent to Pearl White Bletcher, twenty-five per cent to Marcia Bucknell Liston, ten per cent to James H. Bletcher, ten per cent to Hazel Bletcher Skinner, and ten per cent to Charlotte R. B. Robertson, also known as F. K. Robertson Application March 9, 1950, Serial No. 148,544

5 Claims. (Cl. 137—602)

This invention relates to a new and improved surface fitting.

It frequently occurs in attaching multiple water inlet fixtures to hot and cold water pipes that said pipes are not properly aligned to be attached to said fixtures. It is an object of this invention to provide a surface fitting wherein such misalignment of said pipes is compensated for.

Since it is frequently desirable to disengage a fixture from the water supply pipes to repair or clean the parts thereof, it is an object of this invention to provide a surface fitting which can be readily engaged or disengaged from the supply pipes in a very short time.

In what is now considered the preferred embodiment of this invention, complementary surfaces are utilized, each of which is provided with an opening or passageway. One of these surfaces is attached to the water inlet and the other, through suitable passageways, to the outlet of the fixture. Water will flow through the complementary surfaces as long as a portion of one of the openings falls within the other opening when the complementary surfaces bear against one another. Pressure tie means is also provided to insure that the complementary surfaces bear against each other. It is to be understood that various changes in the size, shape or arrangement of the component parts can be resorted to without departing from the scope of this invention or the appended claims.

In the drawings:

Fig. 1 is a plan view of a fixture embodying this invention;

Fig. 2 is a front elevation of the under side of a fixture embodying this invention;

Fig. 3 is a sectional view taken along line 3—3 of Fig. 2;

Fig. 4 is a side elevation in section of a fixture provided with a shower control valve;

Fig. 5 is a diagrammatic view of the flood plates taken along line 5—5 of Fig. 4;

Fig. 6 is a diagrammatic view of an ordinary wash basin adapted to receive a fixture utilizing this surface fitting in a modified form;

Fig. 7 is a side elevation in section of the fixture attached to the wash basin of Fig. 6;

Fig. 8 is a sectional view of a flanged nut utilizing a plug valve to control flow into the fixture;

Fig. 9 is a top plan in section of a modified form of the pressure tie means.

Referring now to Figures 1, 2 and 3, wherein is illustrated a common household fixture adapted to mix hot and cold water, water is supplied through pipes 10 and 12 to the fixture.

In this preferred embodiment of this invention the complementary surfaces which bear against one another may be provided by the flanged nuts 14 and 16 and the flood plates 18 and 20. The flanged nuts providing a surface member are suitably adapted to engage the pipes 10 and 12, which may be accomplished by a threaded connection 22. Suitable passageways are provided to permit flow through the flanged nuts, such as axial flow passage 24 of flanged nut 14. An axial flow passage 26 is provided in flood plate 18 which provides the complementary surface member to permit flow through said flood plate. Similar axial flow passages are provided through flanged nut 16 and flood plate 20.

As illustrated in Figure 3, the passage 24 is retained opposite the passage 26. This construction compensates for vertical or horizontal misalignment of the inlet pipes. For as long as part of the passage 26 falls within the circumference of passage 24, when the flanged nut 14 and flood plate 18 bear against one another, water may pass. An O ring 28 may be retained in a suitable recess 30 in flanged nut 16 surrounding the passageway 24 to prevent leakage while water flows through the surface connection. Preferably one of these passageways is considerably larger than the other to assist in compensating for the above mentioned misalignment although this is not essential to the operation of the surface fitting. It is, of course, apparent that the O ring 28 can be retained in any suitable manner in either flood plate 18 or flanged nut 14.

The flow through pipe 12 into the fixture is identical to flow through pipe 10 and hence will not be described in detail. An O ring 28 is also retained between flanged nut 16 and flood plate 20 to prevent leakage when water is admitted through pipe 12.

After water passes through flood plate 18 or 20 into a suitable chamber 34 disposed behind said flood plates, it passes through a passageway 36 and into a mixing chamber 38. Conventional plug valves 32 may be placed in the chambers 34 to control flow from either pipe 10 or 12 into the mixing chamber in any suitable manner well known to those skilled in the art. In this fashion either hot or cold water or a mixture of the two is introduced into mixing chamber 38 and discharged through spout 40 which is attached to the mixing chamber.

The pressure tie means utilized in this embodiment, as seen in Figure 3, is independent of the axial relationship of passages 24 and 26 and may be constructed as hereinafter described. The housing 42 is provided with suitable openings to permit threaded bolts 44 to pass through and nuts 46 are screwed on the bolts to secure the same to the housing. The bolts 44 are threaded at the other extremity to screw into suitable threaded recesses 47 in lock plate or backing member 48. Lock plate 48 or backing member is provided with suitable openings 50 to permit the pipes 10 and 12 to pass through. The flanged nuts 14 and 16 are then screwed onto the pipes 10 and 12. The flanged portions 52 of the nuts 14 and 16 are larger than the openings 50 so that when the bolts 44 are tightened the lock plate 48 will hold the flanged nuts 14 and 16 against the flood plates 18 and 20 which are rigidly mounted in the housing 42.

It is apparent then that either by loosening nuts 46 or by unscrewing bolts 44 from the lock plate 48 the whole fixture can be removed when, as shown in this embodiment, the flood plates 18 and 20 and mixing chamber 38 and their connecting passages 36 are rigidly connected to the housing 42. This permits replacement of the fixture or repairing of its parts with a minimum of effort and in a short interval of time.

Figures 4 and 5 illustrate a multiple water inlet fixture embodying this invention and provided with a shower outlet and control valve in which the same parts, having the same functional relationship, are given the same number with the addition of an exponent *a*.

It is apparent from the drawings that the fixture therein illustrated is the same fixture illustrated in Figures 1, 2 and 3, with the addition of a shower control valve and a third surface fitting providing a passage from the mixing chamber 38*a* to a shower outlet.

After the hot and cold water have entered the mixing chamber 38*a*, as has previously been described, it passes through passage 53 out spout 49*a* into a bathtub or similar receptacle. In the event it is desired to use the shower, the valve stem 54 is manually raised, seating the valve body 56 against valve seat 58, shutting off the flow through the spout. The pressure of the water against the valve body will keep the valve seated as long as water flows through the fixture and the valve will unseat when the water entering the fixture is shut off. The flow of hot or cold or mixed hot and cold water is then diverted through passage 60 in flood plate 62 through a suitable passage 64 in flanged nut 66, said parts being identical in construction to flanged nuts 14 and 16 and flood plates 18 and 20. A sealing O ring 68 prevents leakage in the surface fitting as the water flows through it into pipe 70 and out shower head 72.

The pressure tie means in this embodiment is identical in operation to the pressure tie means utilized in the fixture illustrated in Figures 1, 2 and 3. In this fixture, however, the lock plate or backing member 48*a* is provided with a third opening 74 to admit pipe 70 but smaller than the flanged portion of nut 66 so that when the housing 42*a* is in position and bolts 44*a* and nuts 46*a* are tightened the lock plate 48*a* will retain the flanged nuts 14*a*, 16*a* and 66 against flood plates 18*a*, 20*a* and 62, respectively.

In either of the two fixtures described, it is a simple matter to remove the fixture from the supply pipes to clean or repair said fixture. It is, of course, necessary to shut off the water in the pipes before removing the fixture. This may be accomplished conveniently by inserting a plug valve in the flanged nuts. Referring now to Figure 8, wherein flanged nut 14*a* is illustrated in section, a plug valve 76 is controlled by eccentric 78 to open or close the flow through the flanged nut 14*a* and similar valves may be inserted in the other flanged nuts heretofore described.

It is to be understood that the pressure tie means, which is independent of the axial relationship of the flow passages, may be constructed as previously described or may be of a modified type as illustrated in Figures 6 and 7 wherein like parts having the same functional relationship will be designated by the same numeral with the addition of the exponent *b*.

The only difference between this modification and the former embodiment lies in the elimination of the lock plate or backing member as a separate element. In this embodiment the lock plate or backing member is made an integral part of the wash basin 80, or similar device upon which it is desired to mount a fixture, by providing suitable openings 82 sufficiently large to permit the supply pipes to enter and sufficiently small to prevent the flanged portion of the flanged nut to pass through. Suitable threaded openings 84 are provided to receive the threaded bolts 44*b*. In all other respects the pressure tie means is identical to the embodiment previously described.

A further modification of the pressure tie means is illustrated in Figure 9. In this embodiment threaded nipples 86 are provided which may be cast with the lock plate or backing member 88 as illustrated or attached thereto in any suitable manner. These nipples are externally threaded to receive the water supply pipes and are provided with flow passages 90 to admit water into the fixture.

In this modification the sealing O ring 92 may be retained in a suitable recess in the lock plate 88 and the flanged nuts may be eliminated. The flood plates then are retained by the housing and threaded bolts which screw into the threaded recesses 94 against the openings 96 in the lock plate 88, the passage of water being similar to that on the modifications previously described.

It is to be understood that changes in the size, shape or location of the various elements do not depart from the spirit of this invention and the full scope of the following claims.

I claim:

1. A surface fitting for a multiple water inlet fixture, comprising; a housing having a front wall and a rearwardly extending peripheral wall, a plurality of first members each having a flow passage therethrough and a coupling surface, said coupling surfaces being located within said housing, a plurality of second members each having a flow passage therethrough and a coupling surface, said coupling surfaces on said second members being complementary to said coupling surfaces on said first members, a backing member associated with each of said second members, tie means extending rearwardly through the housing, said backing member being so associated with said second members and said housing being so associated with said first members that when said tie means draws said backing member and said housing together coupling is effected between the associated coupling surfaces on said first and second members.

2. A surface fitting as set forth in claim 1 wherein said backing member comprises a plate having a plurality of apertures therein, said apertures being associated respectively with said second members, each of said second members having a shoulder which engages the annular surface of said plate surrounding its associated aperture.

3. A surface fitting as set forth in claim 2 wherein said tie means comprises screws which pass through said front wall and screwthreadedly engage said plate.

4. A surface fitting as set forth in claim 1 wherein said backing member comprises a plate which is integrally attached to said second members.

5. A surface fitting as set forth in claim 1 wherein said backing member comprises a wall member on which it is desired to mount said multiple water inlet fixture.

References Cited in the file of this patent

UNITED STATES PATENTS

| Number | Name | Date |
|---|---|---|
| 859,733 | Bot | July 9, 1907 |
| 1,233,170 | Berry | July 10, 1917 |
| 1,699,767 | Stern | Jan. 22, 1929 |
| 1,730,455 | Glauber | Oct. 8, 1929 |
| 1,743,804 | August | Jan. 14, 1930 |
| 1,754,217 | August | Apr. 15, 1930 |
| 2,007,331 | Hollingsworth | July 9, 1935 |

FOREIGN PATENTS

| Number | Country | Date |
|---|---|---|
| 3,883 | Great Britain | July 1891 |